Patented Mar. 15, 1932

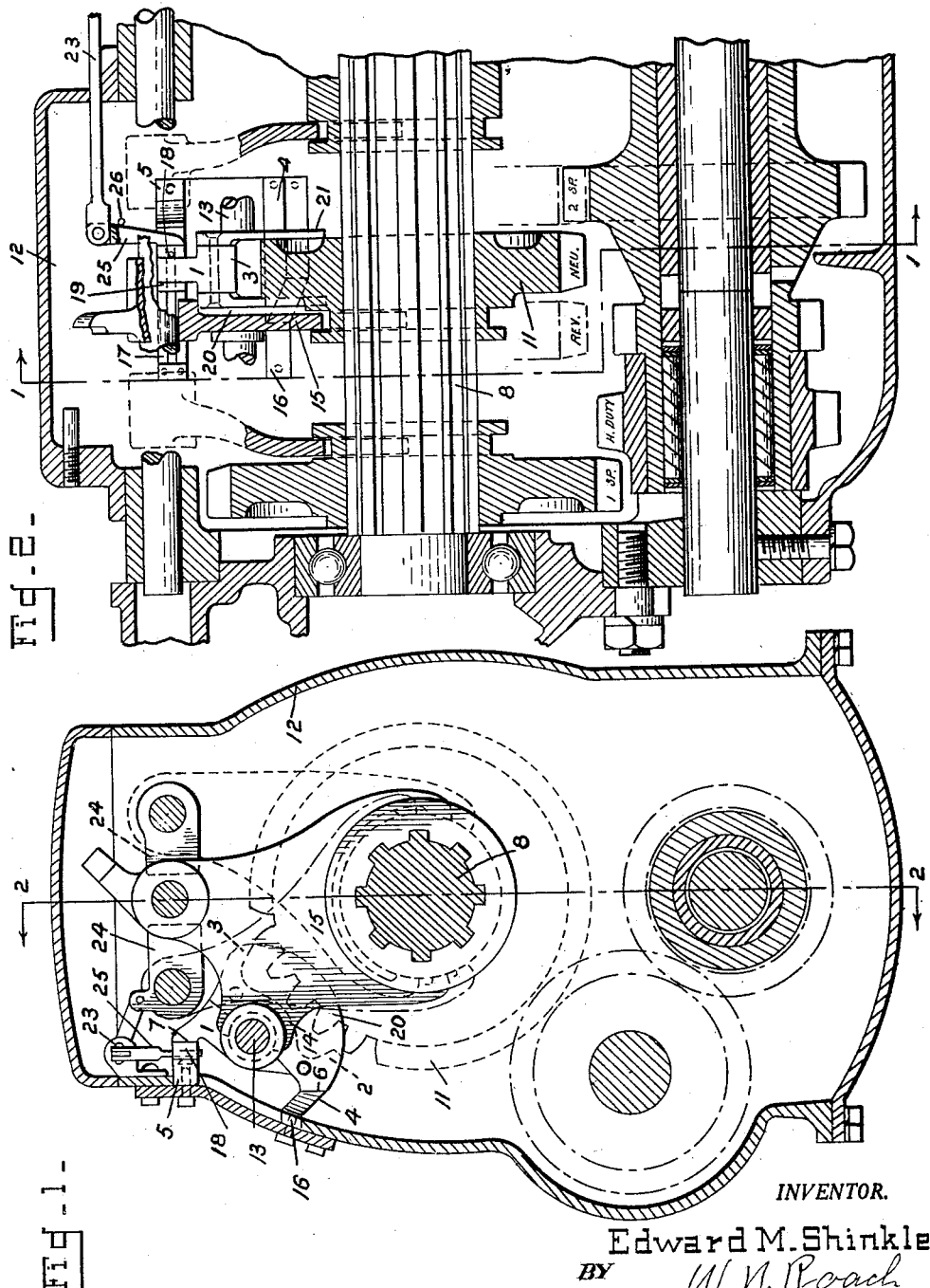

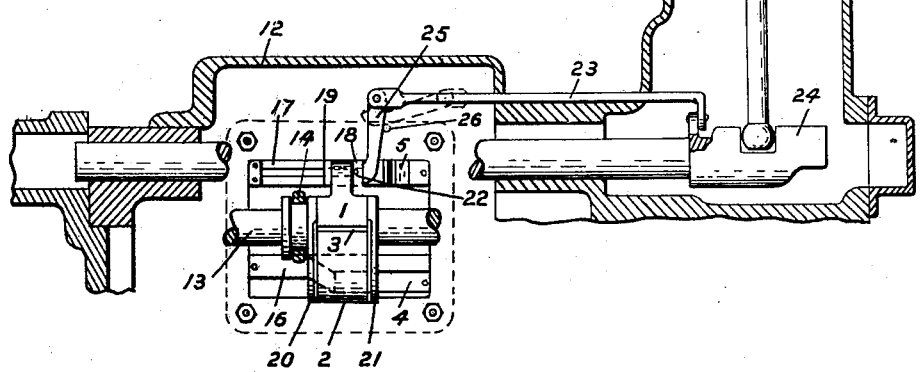
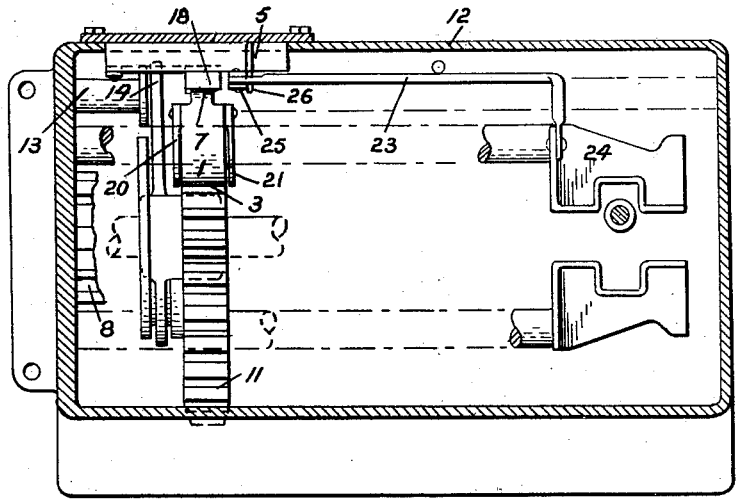
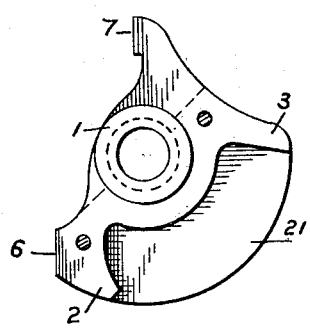
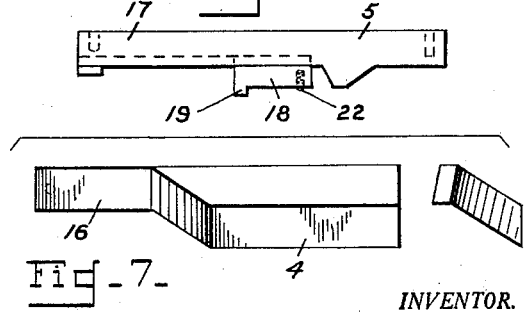

1,849,727

UNITED STATES PATENT OFFICE

EDWARD M. SHINKLE, OF HIGGINSPORT, OHIO

STOP FOR ROTATING PARTS

Application filed February 12, 1930. Serial No. 427,900.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a stop for rotating parts.

This invention relates generally to mechanism for preventing rotation of a driven member in one direction and, more especially, to means mounted adjacent to a shaft, pinion, or the like, for preventing its rotation save in a given direction, that is clockwise or counter-clockwise, as the case may be.

This invention constitutes an improvement in and further development of the invention disclosed in Patent No. 1,625,571 granted to me April 19th, 1927.

The main objects of the invention are the provision of means associated with a sliding gear for prohibiting the movement of the gear in one direction or the other.

A further object of the invention is the provision of means for preventing the prohibiting means from operating while the moving parts retain sufficient speed to cause damage, such means furnishing a simple and novel structure for rendering the device inoperative.

A still further object of the invention is the provision of a simple and novel means for rendering the means for preventing the prohibiting means from operating inoperative.

These objects are attained by providing a gear locking member slidable in unison with a sliding gear and an element movable on the locking member control, restrained from movement during selective movements of the locking member and means for moving the element independently of the sliding movement of the locking member.

With these and such other objects in view, as may hereinafter more fully appear, the invention resides in the novel arrangement and the combination of parts and in the details of construction hereinafter described and claimed, it being understood, however, that changes in the precise embodiment of the invention herein disclosed may be made without departing from the spirit of the invention.

In the drawings, in which a practical embodiment of the invention is disclosed by way of illustration, Fig. 1 is a transverse section of a four speed forward and reverse gearing with the structure forming the subject of this invention incorporated therein taken on the line 1—1 of Fig. 2;

Fig. 2 is a fragmentary longitudinal section of the same taken on the line 2—2 of Fig. 1;

Fig. 3 is a similar enlarged view showing the details of construction of the device;

Fig. 4 is a longitudinal sectional view, parts broken away;

Fig. 5 is an elevation of the pawl;

Fig. 6 is a plan view of the upper control bar; and

Fig. 7 is a face and end view of the lower control bar.

As will be seen from the appended claims, while for the purpose of convenience, the invention has been illustrated in connection with a transmission mechanism, the same is not so limited. The words used in the description should be considered in their descriptive and not in their limiting sense.

In the embodiment of the invention herein shown, the stop mechanism preferably comprises a gear locking member which may conveniently be a pivotally and slidably mounted pawl 1 which may be formed with a pair of gear engaging teeth 2 and 3. To maintain the locking member from movement in one direction or the other, there are preferably employed control bars 4 and 5 which, as illustrated, are suitably secured to the gear casing and positioned to engage surfaces 6 and 7, respectively, on the locking member.

In the particular construction herein illustrated, the locking member 1 is designed to cooperate with the gear 11 slidable on the shaft 8 to selectively mesh with first speed forward or reverse gears.

Referring to the specific application of the invention as a safety stop for automobiles, the transmission housing or casing 12 has supported therein a shaft 13 on which shaft the locking member 1 is mounted for sliding and rocking movements. The locking member is mounted to rock transversely of the housing and in the plane of a shiftable gear preferably, though not necessarily, the gear 11. The locking member is provided with a flanged hub engaged by the shifting fork 14 preferably formed integral with the fork 15 which shifts the gear 11.

The control bar 4 is formed with a reduced portion 16 so that when the gear 11 is shifted to reverse position, the locking member is free to be thrown to lock the gear against forward movement, that is, movement in a counter-clockwise direction as viewed in Fig. 1. The control bar 5 has reduced portions 17 extending throughout the greater portion of its length and upon rearward reduced portion is mounted for reciprocation longitudinally thereof through the medium of the dovetail tongue and groove as shown or in other suitable manner a block 18 which has thereon a stop 19 so that, when the gear 11 is shifted to reverse, the block is picked up by the locking member due to its contact with the stop 19, and carried rearwardly therewith, thus presenting a face against which the surface 7 rests to prevent movement of the locking member when the gear 11 turns in a clockwise direction, as viewed in Fig. 1. The rocking movement of the locking member 1 in one direction or the other may be facilitated by the provision of plates 20 and 21 which contact the gear 11 and by their friction therewith tend to rock the locking member in a direction opposite to the direction of rotation of the gear.

The block may be provided near its forward end with a spring pressed detent 22 adapted to be engaged by the forward edge of the surface 7 to carry the block 18 back to neutral position when the gear is again thrown to neutral from reverse position, and to alloy this surface 7 to depress the detent and to pass by it, when the gear 11 is thrown to first speed forward, due to the block being held at neutral by a suitable stop in this instance the end of the dovetail groove in which the tongue of the block 18 slides. In this position, that is first speed forward, the locking member 1 is free to rock, since the surface 7 thereof overlies the attenuated forward portion of the member 5, and thereby lock the gear against reverse movement, viz: movement in a clockwise direction as viewed in Fig. 1. When the gear 11 is in first speed forward position the locking member 1 is to the right, as viewed in Figs. 3 and 4, of the block 18, and, since the detent 22 is closely adjacent to the forward edge of the block 18, it will contact the rear edge of the surface 7 as the gear 11 is shifted from first speed forward to neutral thereby causing the block 18 to be moved rearwardly ahead of the surface 7 to allow the locking member 1 to be free to act to lock the gears against reversed movement. In order that the block may be moved from neutral position in cases where gears are shifted to intermediate or high speed forward after coming from reverse, there is provided in conjunction with the gear shifting mechanism a rod 23 connected to the shift head 24 and carrying on its rear end the pivoted arm 25 free to swing rearwardly when the rod is moved forwardly but contacting the rod and held against swinging movement about its pivot when the rod is moved rearwardly. The lower end of this arm 25 engages the front face of the block 18 and when the rod is moved rearwardly, as one shifting to intermediate speed, the block is moved to the rear. When shift is made to high speed and the rod, consequently, moved forwardly, the arm 25 contacts the stud or pin 26 and rocks about its pivot thereby kicking the block 18 to the rear.

I claim:

1. In a device of the character described, the combination with rotatable and slidable elements, of a double ended pawl pivotally mounted adjacent to one of said elements, bars adjacent to the pawl, a block on one of the bars slidable with the element to prevent movement of the pawl in one direction, surfaces on the pawl respectively engageable with the block or with the other bar, and means movable with the movement of other slidable elements to move the block from pawl engaging position.

2. In a device of the character described, the combination with rotatable and slidable elements, of a double ended pawl pivotally mounted adjacent to one of said elements, bars adjacent to the pawl, a block slidable on one of the bars to prevent movement of the pawl in one direction, a surface on the other bar to prevent movement of the pawl in the other direction, a rod movable with other slidable elements and an arm pivotally mounted on the rod and engaging the block to move the block from pawl engaging position upon reciprocation of the rod.

EDWARD M. SHINKLE.